United States Patent
Bohn et al.

(10) Patent No.: US 8,503,409 B2
(45) Date of Patent: Aug. 6, 2013

(54) METHOD FOR DIRECT MODE CHANNEL ACCESS

(75) Inventors: Thomas B. Bohn, McHenry, IL (US); David G. Wiatrowski, Woodstock, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 310 days.

(21) Appl. No.: 12/761,023

(22) Filed: Apr. 15, 2010

(65) Prior Publication Data
US 2011/0255521 A1 Oct. 20, 2011

(51) Int. Cl.
H04B 7/212 (2006.01)

(52) U.S. Cl.
USPC ............ 370/337; 370/347; 370/442; 370/459

(58) Field of Classification Search
USPC ................. 370/310, 321–326, 329, 336–337, 370/345–348, 442–445, 458–459; 709/225–226
See application file for complete search history.

(56) References Cited

U.S. PATENT DOCUMENTS

| | | | |
|---|---|---|---|
| 4,698,805 A | 10/1987 | Sasuta et al. | |
| 5,020,130 A | 5/1991 | Grube et al. | |
| 5,179,720 A | 1/1993 | Grube et al. | |
| 5,226,045 A * | 7/1993 | Chuang | 370/347 |
| 5,287,551 A | 2/1994 | Gustafson, Jr. et al. | |
| 5,329,558 A | 7/1994 | Larsson et al. | |
| 5,519,710 A * | 5/1996 | Otsuka | 370/337 |
| 5,699,388 A | 12/1997 | Wang et al. | |
| 5,724,515 A | 3/1998 | Barnes et al. | |
| 5,734,643 A | 3/1998 | Rondeau | |
| 5,759,936 A | 6/1998 | Christiansen et al. | |
| 5,761,211 A | 6/1998 | Yamaguchi et al. | |
| 5,774,786 A | 6/1998 | Wirtjes et al. | |
| 5,905,965 A | 5/1999 | Asano et al. | |
| 6,052,557 A * | 4/2000 | Kinnunen et al. | 370/337 |

(Continued)

FOREIGN PATENT DOCUMENTS

| | | |
|---|---|---|
| EP | 689303 A1 | 12/1995 |
| EP | 0886451 A1 | 12/1998 |

(Continued)

OTHER PUBLICATIONS

Choon Geun Cho, Application PCT/US2009/058326—PCT International Search Report and Written Opinion, WIPO, ISA/KR, Korean Intellectual Property Office, Daejeon, Republic of Korea, May 10, 2010, 10 pages, most relevant pp. 6-7 and 10 for related U.S. Appl. No. 12/331,189.

(Continued)

*Primary Examiner* — Jeffrey M Rutkowski
(74) *Attorney, Agent, or Firm* — Randi L. Karpinia; Daniel R. Bestor (57) ABSTRACT

A method for direct mode channel access in a time division multiple access (TDMA) system includes: assigning a radio operating in the TDMA system to transmission on a first time slot of a direct mode channel; initiating a request for a direct mode transmission on the direct mode channel; determining, by the radio, whether there is communication activity present in the first time slot or a second time slot of the direct mode channel; aligning, by the radio, to a selected slot timing based on the determining step; and transmitting, by the radio, with the selected slot timing on the first time slot.

17 Claims, 5 Drawing Sheets

U.S. PATENT DOCUMENTS

| | | | |
|---|---|---|---|
| 6,052,562 | A | 4/2000 | Dorenbosch |
| 6,061,568 | A | 5/2000 | Dent |
| 6,097,928 | A | 8/2000 | Jeon |
| 6,144,656 | A | 11/2000 | Kinnunen et al. |
| 6,169,728 | B1 | 1/2001 | Perrault et al. |
| 6,411,614 | B1* | 6/2002 | Weigand .................. 370/347 |
| 7,050,419 | B2 | 5/2006 | Azenkot et al. |
| 7,203,207 | B2 | 4/2007 | Hiben |
| 7,499,441 | B2 | 3/2009 | Wiatrowski et al. |
| 8,045,499 | B2 | 10/2011 | Waitrowski et al. |
| 8,139,597 | B2 | 3/2012 | Chowdhary et al. |
| 8,184,654 | B2 | 5/2012 | Patel et al. |
| 8,284,756 | B2* | 10/2012 | Tay ............................ 370/329 |
| 8,385,299 | B2* | 2/2013 | Tay ............................ 370/337 |
| 2002/0173311 | A1 | 11/2002 | Biggs et al. |
| 2003/0002456 | A1 | 1/2003 | Soomro et al. |
| 2003/0058925 | A1 | 3/2003 | Jechoux et al. |
| 2003/0076842 | A1 | 4/2003 | Johansson et al. |
| 2003/0153319 | A1 | 8/2003 | Wieczorek et al. |
| 2004/0196872 | A1 | 10/2004 | Nakamura |
| 2005/0068928 | A1 | 3/2005 | Smith et al. |
| 2005/0070320 | A1 | 3/2005 | Dent |
| 2005/0153666 | A1 | 7/2005 | Nguy et al. |
| 2005/0153723 | A1 | 7/2005 | Hosur et al. |
| 2005/0174963 | A1 | 8/2005 | Hsu |
| 2005/0277383 | A1 | 12/2005 | Reid |
| 2006/0013188 | A1* | 1/2006 | Wiatrowski et al. ......... 370/347 |
| 2006/0041680 | A1 | 2/2006 | Proctor, Jr. et al. |
| 2006/0198346 | A1 | 9/2006 | Liu et al. |
| 2006/0221887 | A1 | 10/2006 | Newberg et al. |
| 2006/0234748 | A1 | 10/2006 | Baik |
| 2006/0245454 | A1 | 11/2006 | Balasubramanian et al. |
| 2007/0104139 | A1 | 5/2007 | Marinier et al. |
| 2007/0129079 | A1 | 6/2007 | Schwarz et al. |
| 2007/0275756 | A1 | 11/2007 | Choi |
| 2008/0008153 | A1 | 1/2008 | Hiben et al. |
| 2008/0151849 | A1 | 6/2008 | Utsunomiya et al. |
| 2008/0165759 | A1* | 7/2008 | Khoo et al. .................... 370/347 |
| 2008/0219191 | A1 | 9/2008 | Wang et al. |
| 2008/0225821 | A1 | 9/2008 | Faith |
| 2008/0232344 | A1 | 9/2008 | Basu et al. |
| 2009/0016283 | A1 | 1/2009 | Zhang et al. |
| 2009/0034432 | A1 | 2/2009 | Bonta et al. |
| 2009/0059877 | A1 | 3/2009 | Utsunomiya et al. |
| 2009/0219916 | A1 | 9/2009 | Bohn |
| 2009/0290511 | A1 | 11/2009 | Budampati et al. |
| 2010/0086092 | A1 | 4/2010 | Wiatrowski et al. |
| 2010/0087142 | A1 | 4/2010 | Panpaliya et al. |
| 2010/0279726 | A1 | 11/2010 | Bohn et al. |
| 2010/0303033 | A1 | 12/2010 | Shahar et al. |
| 2011/0026514 | A1 | 2/2011 | Tay |
| 2011/0096747 | A1 | 4/2011 | Seok |
| 2011/0216746 | A1* | 9/2011 | Tay ............................ 370/337 |
| 2011/0218008 | A1 | 9/2011 | Sim et al. |
| 2012/0327928 | A1 | 12/2012 | Wiatrowski et al. |

FOREIGN PATENT DOCUMENTS

| | | |
|---|---|---|
| EP | 0991216 A2 | 4/2000 |
| EP | 1389025 A1 | 2/2004 |
| EP | 1976165 A2 | 10/2008 |
| GB | 2271690 A | 4/1994 |
| GB | 2409129 A | 6/2005 |
| KR | 10-0349664 B1 | 8/2002 |
| KR | 10-2008-0021454 A | 3/2008 |
| WO | 2005107098 A1 | 11/2005 |
| WO | 2006087265 A1 | 8/2006 |
| WO | 2007036111 A1 | 4/2007 |

OTHER PUBLICATIONS

PCT Notification Concerning Transmittal of International Preliminary Report on Patentability Dated Apr. 14, 2011 for Related U.S. Appl. No. 12/331,189.

PCT International Search Report Dated Mar. 3, 2011 for Related U.S. Appl. No. 12/760,787.

Ahmed Sobeih, et al. "Almost Peer-to-Peer Clock Synchronization"; University of Illinois—IBM; TJ Watson Research Center; IEEE 2007; 10 Pages.

"Electromagnetic Compatibility and Radio Spectrum Matters (ERM); Digital Mobile Radio (DMR) Systems; Part 1 : DMR Air Interface (AI) Protocol," ETSI TS 102 361-1, V1.4.5, Dec. 2007-2012.

Ex Parte Quale Office Action mailed on Jun. 24, 2011, in United States, U.S. Appl. No. 12/331,137, David G. Wiatrowski, filed Dec. 9, 2008.

International Preliminary Report on Patentability for International Application No. PCT/US2009/058545 mailed on Apr. 14, 2011.

International Preliminary Report on Patentability for International Application No. PCT/US2009/058548 mailed on Apr. 14, 2011.

International Preliminary Report on Patentability for related Patent Application No. PCT/US2009/058550 mailed on Apr. 14, 2011.

International Search Report and Written Opinion for related International Application No. PCT/US2009/058545 mailed on Apr. 30, 2010.

International Search Report and Written Opinion for related International Application No. PCT/US2009/058550 mailed on Apr. 30, 2010.

International Search Report and Written Opinion for related International Application No. PCT/US2009/058548 mailed on Apr. 15, 2010.

International Search Report and Written Opinion for related International Application No. PCT/US2011/29700 mailed on Nov. 25, 2011.

Non Final Office Action mailed on Apr. 22, 2011, in United States, related U.S. Appl. No. 12/331,155, Tejal S. Patel, filed Dec. 9, 2008.

Non Final Office Action mailed on Dec. 28, 2011, in United States, related U.S. Appl. No. 12/331,167, Satish R. Panpaliya, filed Dec. 9, 2008.

Non Final Office Action mailed on May 27, 2011, in United States, related U.S. Appl. No. 12/331,180, Dipendra M. Chowdhary, filed Dec. 9, 2008.

Non Final Office Action mailed on Oct. 4, 2011, in United States, related U.S. Appl. No. 12/331,189, David G. Wiatrowski, filed Dec. 9, 2008.

Notice of Allowance mailed on Aug. 8, 2011, in United States, U.S. Appl. No. 12/331,137, David G. Wiatrowski, filed Dec. 9, 2008.

Notice of Allowance mailed on Dec. 14, 2011, in United States, related U.S. Appl. No. 12/331,155, Tejal S. Patel, filed Dec. 9, 2008.

Notice of Allowance mailed on Nov. 7, 2011, in United States, related U.S. Appl. No. 12/331,180, Dipendra M. Chowdhary, filed Dec. 9, 2008.

Supplementary European Search Report for European Application No. 09818328, European Patent Office, The Hague, Netherlands, mailed on Mar. 6, 2012.

Supplementary European Search Report for European Application No. 09818326, European Patent Office, The Hague, Netherlands, mailed on Feb. 27, 2012.

Non Final Office Action mailed on Oct. 10, 2012 in U.S. Appl. No. 12/760,787, Dipendra M. Chowdhary, filed Apr. 15, 2010.

Non Final Office Action mailed on May 11, 2012 in U.S. Appl. No. 12/760,787, Dipendra M. Chowdhary, filed Apr. 15, 2010.

Notice of Allowance mailed on Jul. 6, 2012 in U.S. Appl. No. 12/331,189, David G. Wiatrowski, filed Dec. 9, 2008.

Notice of Allowance mailed on May 18, 2012 in U.S. Appl. No. 12/331,189, David G. Wiatrowski, filed Dec. 9, 2008.

Notice of Allowance mailed on Apr. 5, 2012 in U.S. Appl. No. 12/331,155, Tejal S. Patel, filed Dec. 9, 2008.

Final Office Action mailed on Jul. 19, 2012 in U.S. Appl. No. 12/331,167, Satish R. Panpaliya, filed Dec. 9, 2008.

Supplementary European Search Report for European Application No. 09818325, mailed on Mar. 1, 2012.

International Preliminary Report on Patentability and Written Opinion for International Patent Application Nno. PCT/US2010/062117 mailed on Oct. 26, 2012.

International Preliminary Report on Patentability and Written Opinion for International Patent Application No. PCT/US2011/029700 mailed on Oct. 26, 2012.

International Search Report for International Patent Application No. PCT/US2012/025795 mailed on Aug. 17, 2012.
Notice of Allowance mailed on Nov. 9, 2012 in U.S. Appl. No. 12/331,167, Satish R, Panpaliya, filed Dec. 9, 2008.
International Preliminary Report on Patentability and Written Opinion for International Patent Application No. PCT/US2009/058326 dated Apr. 5, 2011.

Notice of Allowance mailed Feb. 5, 2013 in related U.S. Appl. No. 13/557,903, Dipendra M. Chowdhary, filed Jul. 25, 2012.
Notice of Allowance mailed Mar. 7, 2013 in U.S. Appl. No. 12/760,787, Dipendra M. Chowdhary, filed Apr. 15, 2010.

* cited by examiner

FIG. 1

| TYPE OF RF-CHANNEL ACTIVITY | DIRECT MODE TDMA CHANNEL ACCESS SETTING | RESULTING BEHAVIOR IN RESPONSE TO A TRANSMISSION REQUEST |
|---|---|---|
| FDMA (ANALOG OR DIGITAL) | IMPOLITE | TRANSMIT AFTER FAILING TO DETECT SYNC |
| | POLITE TO OWN COLOR CODE | TRANSMIT AFTER FAILING TO DETECT SYNC |
| | POLITE TO ALL | DENY TRANSMISSION AFTER DETECTING CARRIER PRESENCE |
| TDMA TIME SLOT MATCH AND COLOR CODE MATCH | IMPOLITE | TRANSMIT OVER TDMA ACTIVITY IN TIME SLOT |
| | POLITE TO OWN COLOR CODE | DENY TRANSMISSION REQUEST |
| | POLITE TO ALL | DENY TRANSMISSION REQUEST |
| TDMA TIME SLOT MATCH AND COLOR CODE MISMATCH | IMPOLITE | TRANSMIT OVER TDMA ACTIVITY IN TIME SLOT |
| | POLITE TO OWN COLOR CODE | TRANSMIT OVER TDMA ACTIVITY IN TIME SLOT |
| | POLITE TO ALL | DENY TRANSMISSION REQUEST |
| TDMA TIME SLOT MISMATCH | IMPOLITE | TRANSMIT IN PROGRAMMED TIME SLOT |
| | POLITE TO OWN COLOR CODE | TRANSMIT IN PROGRAMMED TIME SLOT |
| | POLITE TO ALL | TRANSMIT IN PROGRAMMED TIME SLOT |

METHOD FOR DIRECT MODE CHANNEL ACCESS

FIELD OF THE DISCLOSURE

The present disclosure relates generally to wireless communications and more particularly to direct mode operation in a time division multiple access (TDMA) system.

BACKGROUND

The European Telecommunications Standard Institute—Digital Mobile Radio (ETSI-DMR) is a direct digital replacement for analog Private Mobile Radio (PMR). DMR is a scalable system that can be used in unlicensed mode (in a 446.1 to 446.2 Megahertz (MHz) band), and in licensed mode, subject to national frequency planning.

DMR promises improved range, higher data rates, more efficient use of spectrum, and improved battery. Features supported include fast call set-up, calls to groups and individuals, short data and packet data calls. The communications modes include individual calls, group calls, and broadcast calls and, provided via a repeater mode or a direct communication mode among the radios operating within the network.

Other important DMR functions such as emergency calls, priority calls, full duplex communications, short data messages and Internet Protocol (IP)-packet data transmissions are supported.

Direct mode is a mode of operation where radios may communicate outside the control of a network. A radio, as used herein, can be mobile and/or fixed end equipment that is used to obtain DMR services. Direct mode is a communication technique where any radio can communicate with one or more other radios without the need for any additional infrastructure equipment (i.e. repeaters). Direct mode operation is in contrast to the conventional repeater mode which is a mode of operation where radios communicate through infrastructure equipment such as a repeater. Direct mode, therefore, provides more efficient, less costly communication system operation.

The European Telecommunications Standard Institute—Digital Mobile Radio (ETSI-DMR) standard (ETSI TS 102 361-1) describes a time division multiple access (TDMA) air interface protocol. Any of the ETSI standards or specifications referred to herein may be obtained by contacting ETSI at ETSI Secretariat, 650, route des Lucioles, 06921 Sophia-Antipolis Cedex, FRANCE. The Digital Mobile Radio (DMR) air interface standard includes a specification of a protocol used by radios that can both transmit and receive signals at the data link layer (i.e., layer 2) of the well known seven-layer Open Systems Interconnection computer networking model. The ETSI DMR standard specifies a two-slot TDMA structure that transmitting and receiving radios can utilize to send voice and/or data signals. The voice and data signals are transmitted in the TDMA slots in accordance with a general burst format specified in the standard.

The ETSI-DMR standard (ETSI TS 102 361-1) also provides for direct mode transmissions. Channel access, according to the ETSI-DMR standard, further requires accommodation of different levels of radio "politeness" (i.e. Listen Before Transmit (LBT)) and accounting for the co-existence with analog activity and other digital protocols on the same radio frequency (RF) carrier.

The ETSI DMR standard defines channel access for direct mode. For example, ETSI TS 102 361-1 V1.4.5 (2007-12) 5.2.1.1 describes the monitoring by a DMR entity of a channel received signal strength indicator (RSSI) level to determine whether activity is present on a channel. If after a maximum period of time the RSSI level has not exceeded a configurable (within a predefined range) threshold, then the DMR entity presumes that activity is not present on the channel. If however the RSSI level does exceed the threshold, then the DMR entity presumes that activity is present on the channel and it attempts to become synchronized to the activity for specific channel access policies. However, these channel access mechanisms are spectrally inefficient because only one direct mode communication path is provided on the RF channel.

Accordingly, there is a need for a method and apparatus for spectrally efficient channel access rules for TDMA direct mode.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

A method for direct mode channel access in a time division multiple access (TDMA) system includes: assigning a radio operating in the TDMA system to transmission on a first time slot of a direct mode channel; initiating, by the radio, a request for a direct mode transmission on the direct mode channel; determining, by the radio, whether there is communication activity present in the first time slot or any other time slot of the direct mode channel; aligning, by the radio, to a selected slot timing based on the determining step; and transmitting, by the radio, with the selected slot timing on the first time slot.

Figure 1:
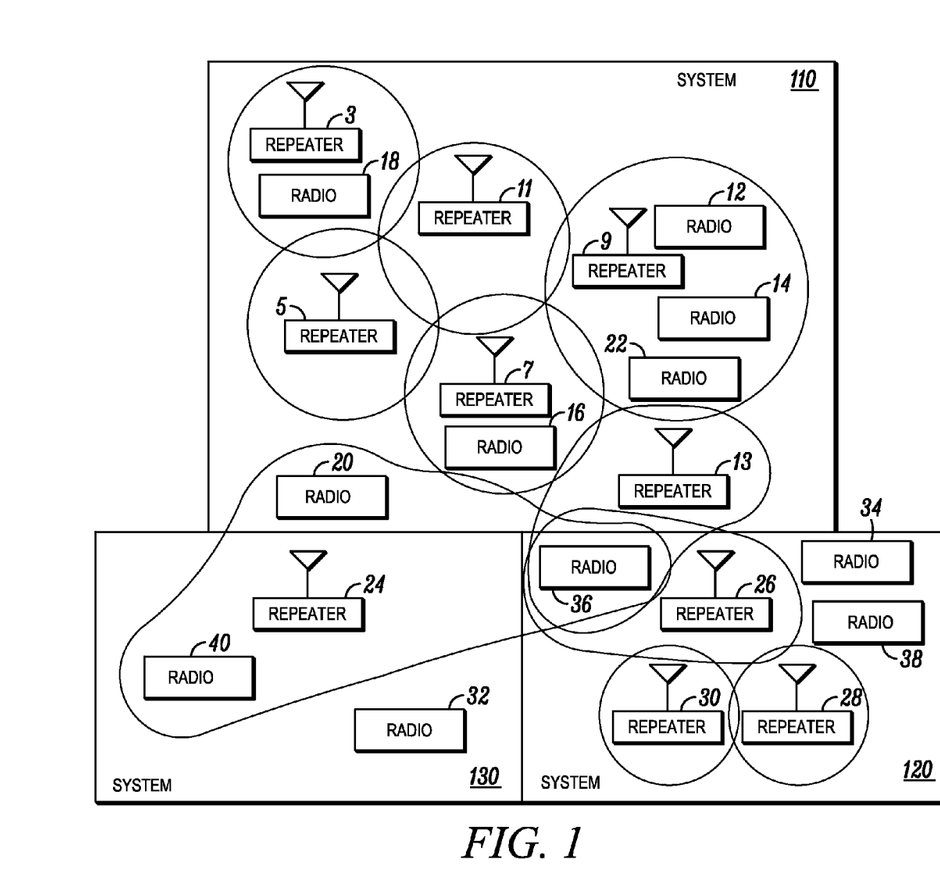
FIG. 1 is a block diagram of an illustrative wireless communications landscape operating in accordance with some embodiments.

Referring now to FIG. 1, an example of a wireless communications landscape 100 having system 110, system 120, and system 130 is illustrated, whereby a system comprises a multiplicity of communication resources of radio frequencies, repeaters, and radios. A radio, as used herein, can be mobile and/or fixed end equipment that is used to obtain DMR services. For example, a radio can be a mobile radio (i.e. a portable radio, a mobile station, a subscriber unit, a mobile subscriber), or can be a fixed station (i.e. a fixed control station, a base station, and any supporting equipment such as wireline consoles and packet data switches). The radios send/receive communications to/from each other either directly or via the repeaters.

In one embodiment, the radios cooperatively operate on the system. System 110 comprises a plurality of cells, each with a repeater 3, 5, 7, 9, 11, 13 typically located at the center of the cell, and a plurality of radios 12, 14, 16, 18, 20, 22, all of which are communicating on radio frequencies assigned to system 110. The radios 12, 14, 16, 18, 20, and 22 in system 110 may operate on any of the radio frequencies associated with the repeaters 3, 5, 7, 9, 11, 13 in system 110. Further, radio 20 may operate on any of the radio frequencies associated with repeater 24 in system 130 since radio 20 is sufficiently close to system 130. System 120 comprises a plurality of cells, each with one or more repeaters 26, 28, and 30 typically located at or near the center of the cell, and a plurality of radios 34, 36, and 38, all of which are communicating on radio frequencies assigned to system 120. The radios 34, 36, and 38 of system 120 may operate on any of the radio frequencies associated with repeaters 26, 28, and/or 30. Further, radio 36 may operate on any of the radio frequencies associated with the repeaters in system 110, system 120 and system 130 since the radio 36 is sufficiently close to all three systems 110, 120, and 130. System 130 comprises a cell with a repeater 24 and radios 32 and 40 all of which are communicating on radio frequencies assigned to system 130.

In yet another embodiment, radios 14 and 22, for example, being in close proximity to each other may communicate with each other using a direct mode of communicating without a repeater. The radios 14 and 22 operate on direct mode radio frequencies.

A repeater comprises fixed equipment for communicating data/control and voice information to and from the radios for facilitating communications between the radios in the wireless communications landscape 100. Each radio is capable of communicating with a repeater or directly with another radio using TDMA techniques as further described herein, in which specified time segments are divided into assigned time slots for individual communications. Each radio frequency in the system carries time slots whereby each time slot is known as a "channel."

For ease of describing the embodiments hereinafter, the wireless communications landscape 100 presumes that each system is a two slot TDMA communications system unless otherwise noted; thus, in the embodiments described below, since there are two time slots, there are two channels available on each radio frequency for carrying the traffic of the system. A time slot is an elementary timing of the physical channel. For example, in one embodiment, a time slot has a duration of thirty milliseconds (30 ms) and is numbered "1" or "2". It is important to note, however, that the TDMA communication system may have other slotting ratios, as well, and still remain within the spirit and scope of the present invention. Thus, the present invention is applicable to any TDMA communication system that has a slotting ratio that is n:1, where n is an integer greater than 1.

The ETSI-DMR standard (ETSI TS 102 361-1) also provides for transmit admission criteria (see for example, 5.2.1.6 transmit admit criteria). Where a radio has been solicited to transmit a response, it may transmit the response in the expected time slot irrespective of whether the channel is idle or busy. Additionally, while a radio is partied to a voice call, it may transmit irrespective of whether the channel is idle or busy with DMR activity pertaining to the same voice call.

However, for all other situations, radios are configurable to employ levels of "politeness" on a channel. In accordance with the ETSI-DMR standard, the politeness levels are defined as:

Polite to all: The radio refrains from transmitting on a channel while the channel state is busy with other activity Polite to own Color Code: The radio refrains from transmitting on the logical channel while the channel state is busy with other DMR activity containing the radio's own or intended Color Code. For all other types of activity (including DMR activity containing a different Color Code) already present on the channel, the radio shall transmit regardless.

Impolite: The radio transmits on a channel regardless of any other activity (either DMR or otherwise) already present on the channel.

On a given channel, not all features may be supported at the same level of politeness. For example, voice transmissions may be configured to be "impolite" while packet data transmissions are configured to be "polite".

Before accessing the channel for voice communication, the radio considers one or more of its provisioned characteristics. A provisioned characteristic of the radio is a programmed attribute or feature which instructs the radio how to operate. In an illustrative embodiment, Customer Provisioning Software (CPS) (also known as Radio Service Software (RSS)), is used for assigning the radio a provisioned characteristic. For example, the radio can access the channel with a provisioned characteristic of politeness as described herein above.

As is known in the art, "color code" is a common identifier used by a group collection of radios which communicate within a particular communication group. For example, radios operating in repeater mode and utilizing the same repeater may have the same color code. For example, as shown in FIG. 1, radios 12, 14, and 22 are all using one particular color code because they utilize the same repeater, namely repeater 9. Alternatively, radios communicating with each other in direct mode (i.e. because they are in close proximity to each other, belong to a same network, belong to a same organization, belong to a same communication group, and the like), may have the same color code. For example, in FIG. 1, radios 14 and 22 may be using one particular color code for direct mode communication because they are in close proximity to each other. Similarly, radios 32 and 40 may be using another particular color code for direct mode communication because they belong to a same network (system 130).

A color code field may be present in an embedded signaling message and general data burst to provide a means of addressing a radio network or a specific repeater so that co-channel interference may be rejected. Further known in the art, a "talkgroup" is a subset of radios using a common color code. The subset of radios, therefore, shares a common talkgroup identifier (TGID). In an illustrative embodiment, a talkgroup is identified by a 24-bit talkgroup identifier (TGID) and an individual radio is identified by a 24-bit identifier (ID). Thus, in one embodiment, radios that share a color code are further subdivided into talkgroups so that radios in one talkgroup do not hear radios in another talkgroup.

Figure 2:
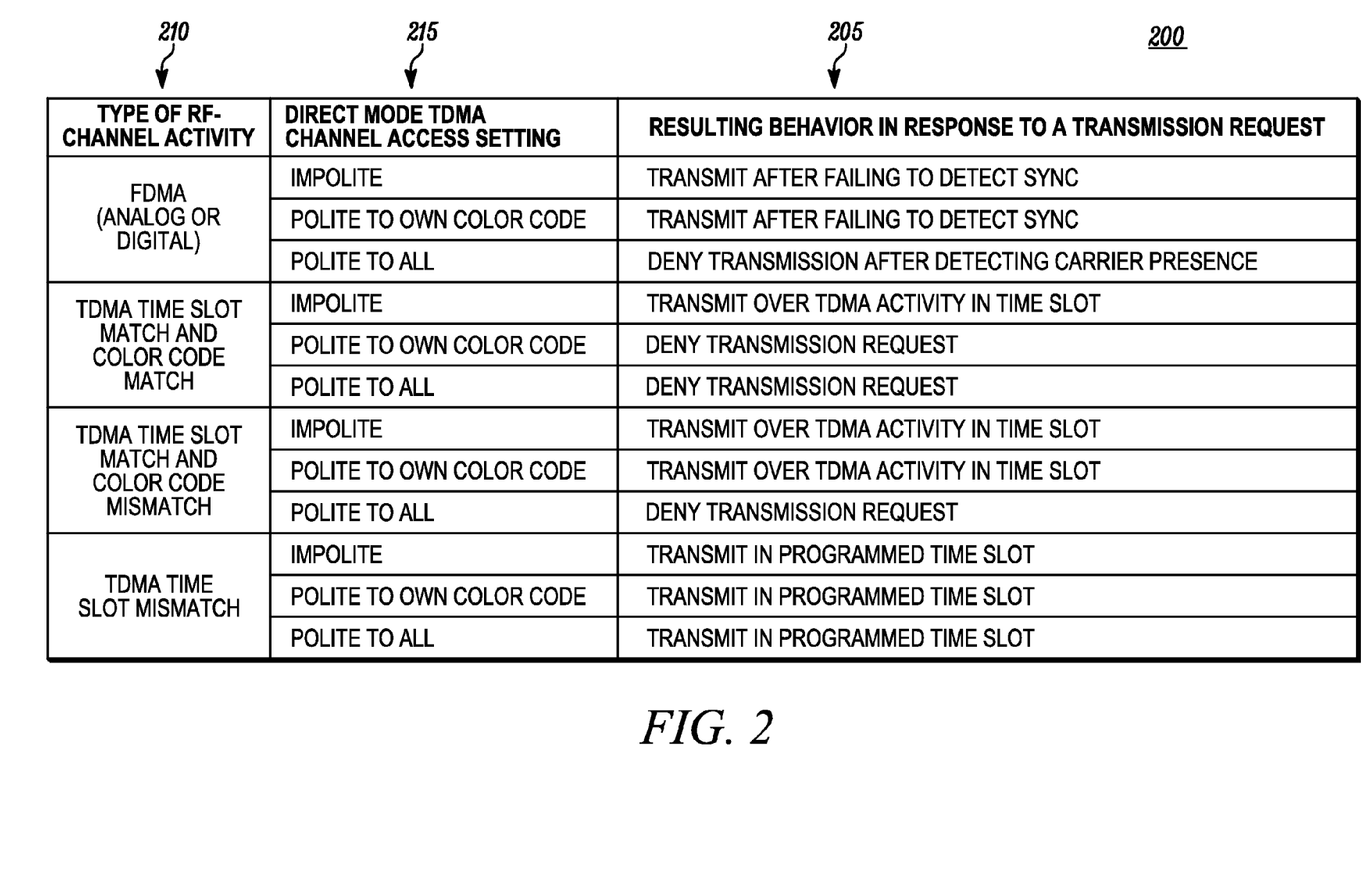
FIG. 2 is a table illustrating the operation of a system for direct mode channel access in accordance with some embodiments.

FIG. 2 is a table 200 illustrating access results for a transmission request in accordance with some embodiments. The transmission request, for example, can be a push to talk (PTT) request or a request to transmit a data message. Specifically, FIG. 2 illustrates resulting behavior in response to a transmission request 205 for each of a combination of a type of radio frequency (RF) channel activity 210 and a direct mode TDMA channel access (politeness) setting 215. The type of RF channel activity 210, in accordance with some embodiments, refers to the type of signals present on the RF channel at the time of the transmission request.

As illustrated, when the type of RF channel activity 210 is frequency division multiple access (FDMA) at the time of the transmission request, when a radio has a direct mode TDMA channel access setting 215 of "impolite", the resulting behavior in response to a transmission request 205 is that the direct mode TDMA radio transmits on the channel after failing to detect a TDMA direct mode synchronization (sync) word. When the radio direct mode TDMA channel access setting 215 is "polite to own color code", the resulting behavior in response to a transmission request 205 is that the direct mode TDMA radio transmits after failing to detect a TDMA direct mode sync word. However, when the radio's direct mode TDMA channel access setting 215 is "polite to all", the resulting behavior in response to a transmission request 205 is that the direct mode TDMA radio denies the transmission request after detecting presence of a carrier on the RF channel.

Further, when the type of RF channel activity 210 is of type TDMA and the TDMA activity is present in a time slot and using a color code consistent with the channel the radio is attempting to transmit on (i.e. the time slot and color code which the radio is provisioned with), when a radio has a direct mode TDMA channel access setting 215 of "impolite", the resulting behavior in response to a transmission request 205 is that the direct mode TDMA radio transmits over the TDMA activity present in the time slot (or TDMA channel). When the radio direct mode TDMA channel access setting 215 is "polite to own color code", the resulting behavior in response to a transmission request 205 is that the direct mode TDMA radio denies the transmission request. When the radio direct mode channel access setting 215 is "polite to all", the resulting behavior in response to a transmission request 205 is that the direct mode TDMA radio denies the transmission request.

Further, when the type of RF channel activity 210 is of type TDMA and the TDMA activity is present in a time slot consistent with the channel the radio is attempting to transmit on but is using a color code inconsistent with the channel the radio is attempting to transmit on, (i.e. a color code which is different from the color code that the mobile station is provisioned with), when a radio has a direct mode TDMA channel access setting 215 of "impolite", the resulting behavior in response to a transmission request 205 is that the direct mode TDMA radio transmits over the TDMA activity present in the time slot (or TDMA channel). When the radio direct mode TDMA channel access setting 215 is "polite to own color code", the resulting behavior for a transmission request 205 is that the radio transmits over the TDMA activity present in the time slot (or TDMA channel). When the radio direct mode TDMA access setting 215 is "polite to all", the resulting behavior in response to a transmission request 205 is that the direct mode TDMA radio denies the transmission request.

Further, when the type of RF channel activity 210 is of type TDMA and the TDMA activity is present in a time slot inconsistent with the channel the radio is attempting to transmit on, the direct mode TDMA radio transmits in the programmed time slot for all access "politeness" settings irrespective of whether the color code matches or mismatches.

The operation described and illustrated in FIG. 2 supports licensed regulation of frequency and time slot. It supports agency 1 color code in slot 1 and agency 2 color code in slot 2. It will be appreciated that this operation is not possible in repeater mode as downlink transmissions are present in both slots and both slots use the same color code.

Figure 3:
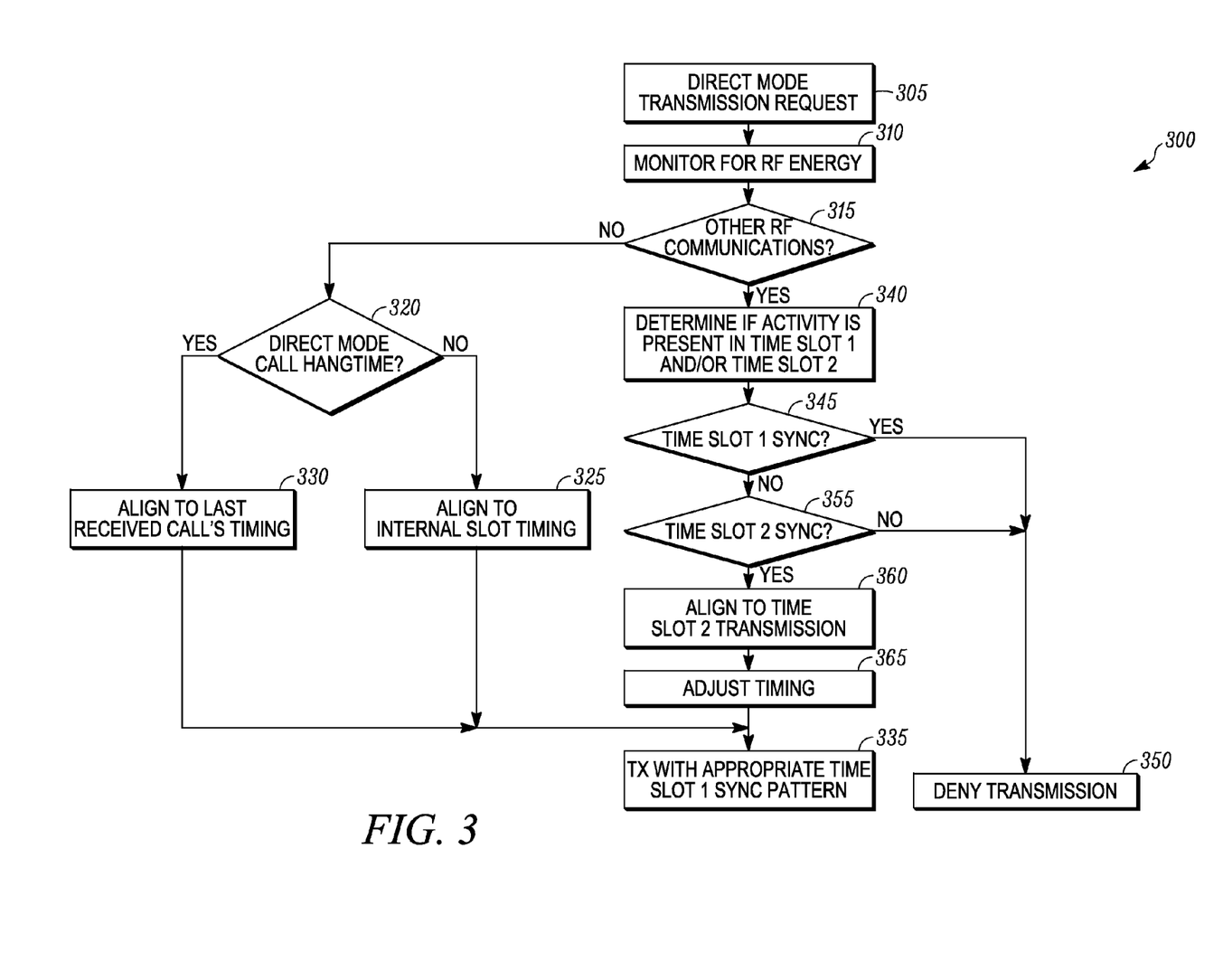
FIG. 3, FIG. 4, and FIG. 5 are flowcharts illustrating the operation of a radio in accordance with various embodiments.

FIG. 3 is a flowchart illustrating the operation of a radio in accordance with some embodiments. Specifically, FIG. 3 illustrates an operation 300 of a radio which has a channel access setting of "polite to all." It will be appreciated by those of ordinary skill in the art that a radio could be provisioned to operate in either time slot 1 or time slot 2. For illustrative purposes, the operation of FIG. 3 illustrates a radio assigned for time slot 1 transmission. In other words, time slot 1 is a desired transmission time slot for the radio. If, alternatively, the radio had been assigned for time slot 2 transmission, the operation and description of FIG. 3 would interchange time slots (i.e. timeslot 1 would become timeslot 2 and timeslot 2 would become timeslot 1.) Further, it will be appreciated by those of ordinary skill in the art that the use of time slots 1 and 2 is for illustrative purposes only for an RF channel supporting two time slots, and that the time slots of FIG. 3 can be extended for an RF channel supporting more than two time slots.

As illustrated in FIG. 3, the operation begins when a direct mode transmission is requested in Step 305. In one embodiment, a user of the radio can initiate the request, for example by pressing a push to talk button (PTT). In an alternate embodiment, a peripheral attached to the radio, such as a personal computer and the like, can initiate the request (either in response to user control or automatically). In another embodiment, the radio itself can initiate the request (for example, automatically, in response to determining it is time to transmit a location update).

Next, in Step 310, the radio monitors for the presence of RF energy on the channel. In Step 315, the radio determines whether there are other RF communications currently on the direct mode frequency before accessing the channel for its own communications. For example, the radio can compare detected RF energy with a threshold value. The threshold value, for example, can be a predetermined threshold value stored in the radio. When no RF communications are detected in Step 315, in one embodiment, (not shown), the operation continues with Step 325 in which the radio aligns to its internal slot timing.

In an alternate embodiment, as illustrated in FIG. 3, when no RF communications are detected in Step 315, the operation continues to Step 320 in which the radio determines whether the channel is currently in a direct mode call hangtime. Direct mode call hangtime is defined as a specified period of time beginning at the end of a radio's voice transmission during which there is no activity on the channel. Radios are given the opportunity to attempt channel access during direct mode call hangtime and take advantage of the most recently used slot timing. When the channel is not in a state of direct mode call hangtime, the operation continues with Step 325 in which the radio aligns to its internal slot timing. Next, in Step 335, the radio transmits on the desired time slot (i.e. assigned time slot 1) with the appropriate time slot 1 sync pattern using the channel timing selected in step 325. Returning to Step 320, when the channel is in a state of direct mode call hangtime the operation continues to Step 330 in which the radio aligns to the last received call's timing. Next, in Step 335, the radio transmits on the desired time slot (i.e. assigned time slot 1) with the appropriate time slot 1 sync pattern using the channel timing selected in step 330.

Returning to Step 315, when the radio detects RF communications on the desired channel, the operation continues with Step 340 in which the radio attempts to determine whether there is activity present in the desired transmission time slot, (i.e. time slot 1) and/or in any other time slot(s), (i.e. time slot 2). For example, the radio can run time slot 1 and time slot 2 sync detectors. It will be appreciated by those of ordinary skill in the art that time slot 1 and time slot 2, in one embodiment, can each use a different sync pattern, as described in United States Application Publication Number 20100086092 to Wiatrowski et al, entitled "Method Of Efficiently Synchronizing To A Desired Timeslot In A Time Division Multiple Access Communication System," published Apr. 8, 2010, assigned to the assignee of the present invention, which contents is herein incorporated by reference. In other words, the radio searches the desired channel for synchronization patterns associated with time slot 1 and associated with time slot 2.

It will also be appreciated by those skilled in the art that when an RF channel supports more than two (2) time slots, the radio searches for a synchronization pattern for each time slot. For example if the RF channel supports four time slots, the radio searches for synchronization patterns in each of the four time slots.

Next, in Step 345, the radio determines whether there is a desired transmission time slot (i.e. time slot 1) synchronization pattern present on the RF channel. When there is a desired transmission time slot (i.e. time slot 1) synchronization pattern present, the operation continues to Step 350 and the transmission is denied. When the desired transmission time slot (i.e. time slot 1) synchronization pattern is not present on the RF channel, the operation continues to Step 355 in which the radio determines whether there is an undesired transmission time slot (i.e. time slot 2) synchronization pattern present on the RF channel to indicate activity in a time slot other than the desired transmission time slot. When there is not an undesired transmission time slot (i.e. time slot 2) synchronization pattern present on the RF channel, the operation continues to Step 350 in which the transmission is denied. When there is an undesired transmission time slot (i.e. time slot 2) synchronization pattern present on the RF channel in Step 355, the operation continues to Step 360 in which the radio aligns itself to the undesired time slot (i.e. time slot 2) transmission. Next, in Step 365, the radio adjusts its timing from the undesired time slot (i.e. time slot 2) to the desired time slot (i.e. time slot 1), for example, by shifting its timing by a particular time slot duration. In one embodiment, the time slot duration is 30 milliseconds. In another embodiment, when there are more than two timeslots, the timing is shifted by an integral multiple of the time slot duration (i.e. integral multiple of 30 milliseconds when the time slot duration is 30 milliseconds). For example, if the RF channel supports four time slots, the desired transmission time slot is time slot 2, and the radio aligns to time slot 4, then the radio shifts its timing by 2 times the time slot duration to move to the desired time slot.

Next, in Step 335, the radio transmits on the desired time slot (i.e. assigned time slot 1) with the appropriate time slot 1 synchronization pattern and with the appropriate channel timing using the channel timing selected in steps 360 and 365.

Figure 4:
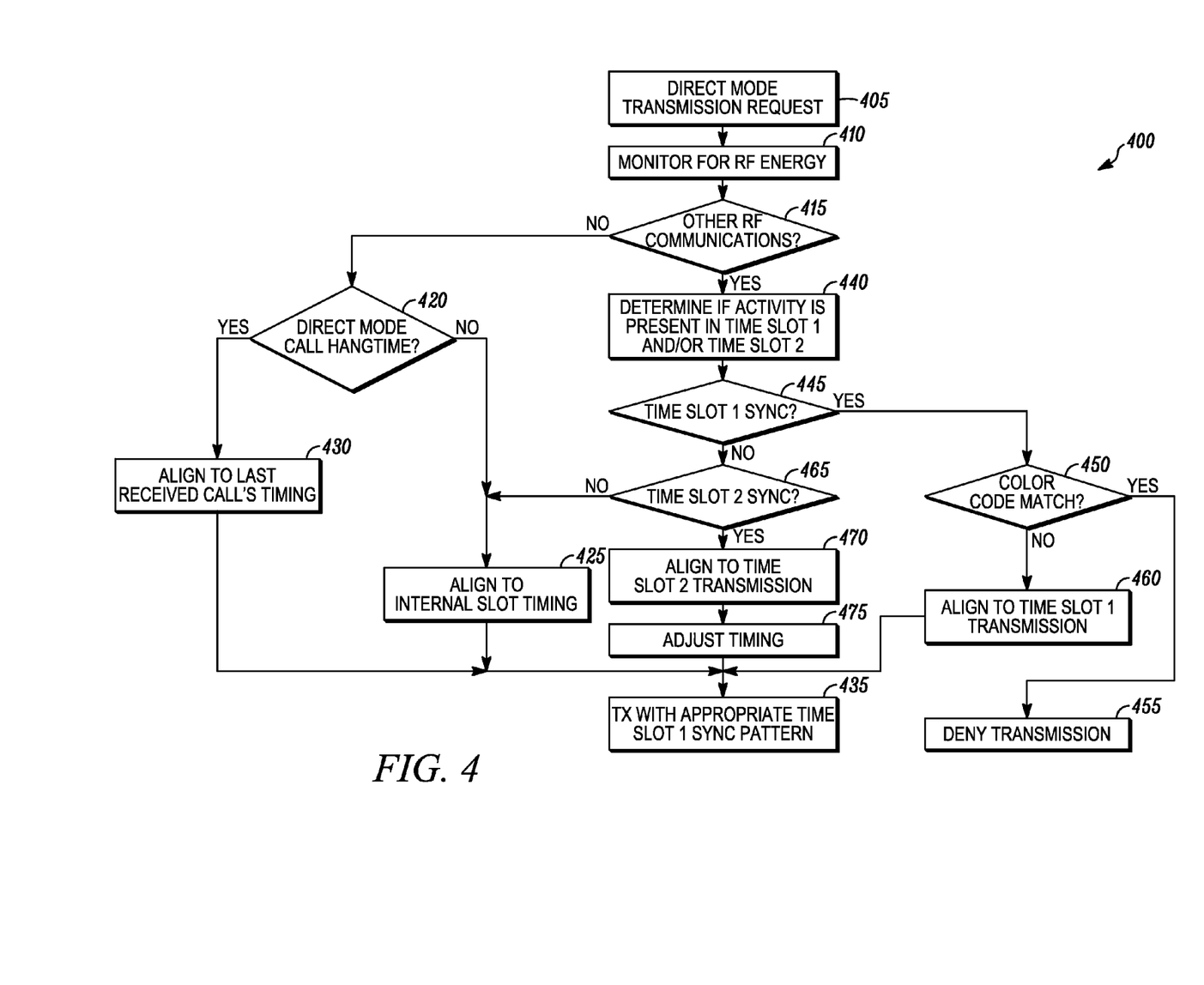

FIG. 4 is a flowchart illustrating the operation of a radio in accordance with some embodiments. Specifically, FIG. 4 illustrates an operation 400 of a radio which has a channel access setting of "polite to own color code." For illustrative purposes, operation of FIG. 4 illustrates a radio assigned for time slot 1 transmission. In other words, time slot 1 is a desired transmission time slot for the radio. If, alternatively, the radio had been assigned for time slot 2 transmission, the operation and description of FIG. 4 would interchange time slots (i.e. timeslot 1 would become timeslot 2 and timeslot 2 would become timeslot 1.) Further, it will be appreciated by those of ordinary skill in the art that the use of time slots 1 and 2 is for illustrative purposes only for an RF channel supporting two timeslots, and that the time slots of FIG. 4 can be extended for an RF channel supporting more than two time slots.

As illustrated in FIG. 4, the operation begins when a direct mode transmission is requested in Step 405. In one embodiment, a user of the radio can initiate the request, for example by pressing a push to talk button (PTT). In an alternate embodiment, a peripheral attached to the radio, such as a personal computer and the like, can initiate the request (either in response to user control or automatically). In another embodiment, the radio itself can initiate the request (for example, automatically, in response to determining it is time to transmit a location update).

Next, in Step 410, the radio monitors for the presence of RF energy on the channel. In Step 415, the radio determines whether there are other RF communications currently on the direct mode frequency before accessing the channel for its own communications. For example, the radio can compare detected RF energy with a threshold value. The threshold value, for example, can be a predetermined threshold value stored in the radio. When no RF communications are detected in Step 415, in one embodiment, (not shown), the operation continues with Step 425 in which the radio aligns to its internal slot timing.

In an alternate embodiment, as illustrated in FIG. 4, when no RF communications are detected in Step 415, the operation continues to Step 420 in which the radio determines whether the channel is currently in a direct mode call hangtime. When the channel is not in a state of direct mode call hangtime, the operation continues with Step 425 in which the radio aligns to its internal slot timing. Next, in Step 435, the radio transmits on the desired time slot (i.e. assigned time slot 1) with the appropriate time slot 1 sync pattern using the channel timing selected in step 425. Returning to Step 420, when the channel is in a state of direct mode call hangtime the operation continues to Step 430 in which the radio aligns to its last received call's timing. Next, in Step 435, the radio transmits on the desired time slot (i.e. assigned time slot 1) with the appropriate time slot 1 sync pattern using the channel timing selected in Step 430.

Returning to Step 415, when the radio detects RF communications on the desired channel, the operation continues with Step 440 in which the radio attempts to determine whether there is activity present in the desired transmission time slot (i.e. time slot 1) and/or in any other time slot(s) (i.e. time slot 2). For example, the radio can run time slot 1 and time slot 2 sync detectors. In other words, the radio searches the desired channel for synchronization patterns associated with time slot 1 and associated with time slot 2.

It will also be appreciated by those skilled in the art that when an RF channel supports more than two (2) time slots, the radio searches for a synchronization pattern for each time slot. For example if the RF channel supports four time slots, the radio searches for synchronization patterns in each of the four time slots.

Next, in Step 445, the radio determines whether there is a desired transmission time slot (i.e. time slot 1) synchronization pattern present on the RF channel. When there is a desired transmission time slot (i.e. time slot 1) synchronization pattern present, the operation continues to Step 450 in which the radio determines if there is a color code match, meaning the color code being received over the air matches the color code that is provisioned into the radio. When there is a color code match, the operation continues to Step 455 and the transmission is denied. When there is no color code match, the operation continues to Step 460 in which the radio aligns itself to the desired time slot (i.e. time slot 1) transmission. Next, in Step 435, the radio transmits on the desired time slot (i.e. assigned time slot 1) with the appropriate time slot 1 synchronization pattern and with the appropriate channel timing selected in step 460.

Returning to Step 445, when the desired transmission time slot (i.e. time slot 1) synchronization pattern is not present on the RF channel, the operation continues to Step 465 in which the radio determines whether there is an undesired transmission time slot (i.e. time slot 2) synchronization pattern present on the RF channel to indicate activity in a time slot other than the desired transmission time slot. When the undesired transmission time slot (i.e. time slot 2) synchronization pattern is not present on the RF channel, the operation proceeds to Step 425 in which the radio aligns to its internal slot timing. Next, in Step 435, the radio transmits on the desired time slot (i.e. assigned time slot 1) with the appropriate time slot 1 sync pattern using the channel timing selected in step 425.

When the undesired transmission time slot (i.e. time slot 2) synchronization pattern is present in Step 465, the operation continues to Step 470 in which the radio aligns itself to the undesired time slot (i.e. time slot 2) transmission. Next, in Step 475, the radio adjusts its timing, from the undesired time slot (time slot 2) to the desired time slot (time slot 1), for example, by shifting its timing by a particular time slot duration. In one embodiment, the time slot duration is 30 milliseconds. In another embodiment, when there are more than two timeslots, the timing is shifted by an integral multiple of the time slot duration (i.e. integral multiple of 30 milliseconds when the time slot duration is 30 milliseconds). For example, if the RF channel supports four time slots, the desired transmission time slot is time slot 2, and the radio aligns to time slot 4, then the radio shifts its timing by 2 times the time slot duration to move to the desired time slot.

Next, in Step 435, the radio transmits on the desired time slot (i.e. assigned time slot 1) with the appropriate time slot 1 synchronization pattern and with the appropriate channel timing using the channel timing selected in steps 470 and 475.

Figure 5:
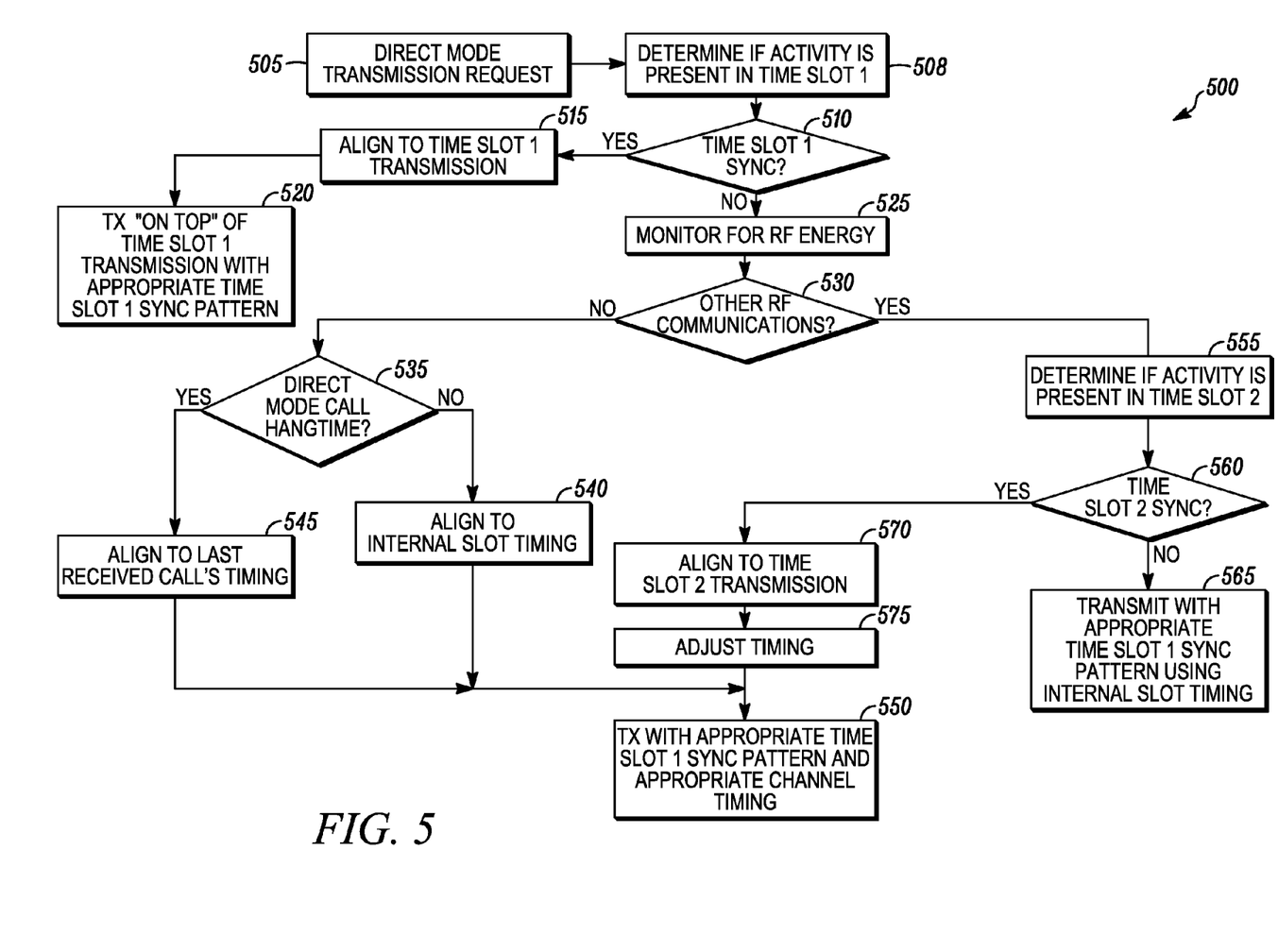

FIG. 5 is a flowchart illustrating the operation of a radio in accordance with some embodiments. Specifically, FIG. 5 illustrates an operation 500 of a radio which has a channel access setting of "impolite channel access." It will be appreciated by those of ordinary skill in the art that a radio could be provisioned to operate in either time slot 1 or time slot 2. For illustrative purposes, the operation of FIG. 5 illustrates a radio assigned for time slot 1 transmission. In other words, time slot 1 is a desired transmission time slot for the radio. If, alternatively, the radio had been assigned for time slot 2 transmission, the operation and description of FIG. 5 would interchange time slots (i.e. timeslot 1 would become timeslot 2 and timeslot 2 would become timeslot 1.) Further, it will be appreciated by those of ordinary skill in the art that the use of time slots 1 and 2 is for illustrative purposes only for an RF channel supporting two time slots, and that the time slots of FIG. 5 can be extended for an RF channel supporting more than two time slots.

As illustrated in FIG. 5, the operation begins when a direct mode transmission is requested in Step 505. In one embodiment, a user of the radio can initiate the request, for example by pressing a push to talk button (PTT). In an alternate embodiment, a peripheral attached to the radio, such as a personal computer and the like, can initiate the request (either in response to user control or automatically). In another embodiment, the radio itself can initiate the request (for example, automatically, in response to determining it is time to transmit a location update).

Next, in Step 508, the radio attempts to determine whether there is activity present in the desired transmission time slot (i.e. time slot 1). For example, the radio can run a time slot 1 sync detector. Next, in Step 510, the radio determines whether there is a desired transmission time slot (i.e. time slot 1) synchronization pattern present on the RF channel. When there is a desired transmission time slot (i.e. time slot 1) synchronization pattern present, the operation continues to Step 515 in which the radio aligns itself to the desired time slot (i.e. time slot 1) transmission. Next, in Step 520, the radio transmits "on top" of the desired time slot (i.e. time slot 1) transmission with the appropriate desired time slot (i.e. time slot 1) synchronization pattern and with the appropriate channel timing using the channel timing selected in step 515. In other words, the radio transmits at the same time, on the same frequency, and in the same time slot as another radio's transmission.

Returning to Step 510, when the desired transmission time slot (i.e. time slot 1) synchronization pattern is not present on the RF channel, the operation continues with Step 525 in which the radio monitors for presence of RF energy on the channel. In Step 530, the radio determines whether there are other RF communications currently on the direct mode frequency before accessing the channel for its own communications. For example, the radio can compare detected RF energy with a threshold value. The threshold value, for example, can be a predetermined threshold value stored in the radio. When no RF communications are detected in Step 530, in one embodiment, (not shown), the operation continues with Step 540 in which the radio aligns to its internal slot timing.

In an alternate embodiment, as illustrated in FIG. 5, when no RF communications are detected in Step 530, the operation continues to Step 535 in which the radio determines whether the channel is currently in a direct mode call hangtime. When the channel is not in a state of direct mode call hangtime, the operation continues with Step 540 in which the radio aligns to its internal slot timing. Next, in Step 550, the radio transmits on the desired transmission time slot (i.e. assigned time slot 1) with the appropriate time slot 1 sync pattern using the channel timing selected in step 540.

Returning to Step 535, when the channel is in a state of direct mode call hangtime the operation continues to Step 545 in which the radio aligns to its last received call's timing. Next, in Step 550, the radio transmits on the desired transmission time slot (i.e. assigned time slot 1) with the appropriate time slot 1 sync pattern using the channel timing selected in Step 545.

Returning to Step 530, when the radio detects presence of RF communications (RF energy) on the desired channel, the operation continues with Step 555 in which the radio attempts to determine whether there is activity present in an undesired transmission time slot (i.e. time slot 2). For example, the radio can run a time slot 2 sync detector. Next, in Step 560, the radio determines whether there is an undesired transmission time slot (i.e. time slot 2) synchronization pattern present on the RF channel. When the undesired transmission time slot (i.e. time slot 2) synchronization pattern is not present on the RF channel, the operation continues to Step 565 in which the radio transmits on the desired time slot (i.e. assigned time slot 1) with the appropriate time slot 1 synchronization pattern while using its internal slot timing.

When an undesired transmission time slot (i.e. time slot 2) synchronization pattern is present in Step 560, the operation continues to Step 570 in which the radio aligns itself to the undesired time slot (i.e. time slot 2) transmission. Next, in Step 575, the radio adjusts its timing from the undesired time slot (time slot 2) to the desired time slot (time slot 1), for example, by shifting its timing by a particular time slot duration. In one embodiment, the time slot duration is 30 milliseconds. In another embodiment, when there are more than two timeslots, the timing is shifted by an integral multiple of the time slot duration (i.e. integral multiple of 30 milliseconds when the time slot duration is 30 milliseconds). For example, if the RF channel supports four time slots, the desired transmission time slot is time slot 2, and the radio aligns to time slot 4, then the radio shifts its timing by 2 times the time slot duration to move to the desired time slot.

Next, in Step 550, the radio transmits on the desired transmission time slot (i.e. assigned time slot 1) with the appropriate time slot 1 synchronization pattern and with the appropriate channel timing using the channel timing selected in steps 570 and 575.

As described herein, radios are configured to operate on one of a multiple number of slots on a frequency; for ETSI DMR there are two slots per frequency. When accessing the channel, the radio determines the current activity on the channel and responds appropriately per configuration. Current activity includes a slot 1 or slot 2 transmission on the frequency for the 2 slot TDMA DMR case. In addition to monitoring for RF energy (channel in use or idle), running a sync correlator (ETSI DMR or other; P25, etc) and identifying color codes (determine whether the received color code match a color code provisioned in the radio), the access rules now must run multiple sync correlators to determine if the pre-configured slot is idle or has activity.

The invention supports the licensing of frequencies and time slots for direct mode communications, which in turn provides spectrally efficient communications on today's channel plans. The access rules are such that the new mode can co-exist on the same frequency with analog or digital FDMA as well as with digital TDMA with different color codes. It supports different color code transmissions on the different slots, something repeater mode is not capable of supporting.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for direct mode channel access in a time division multiple access (TDMA) system, the method comprising:

assigning a radio operating in the TDMA system to transmit on a desired time slot of a direct mode channel;

initiating a request for a direct mode transmission from the radio on the direct mode channel;

determining, by the radio, whether there is communication activity present in the desired time slot or in one or more undesired time slots of the direct mode channel;

aligning, by the radio, to a selected slot timing based at least in part on the determining step; and transmitting, by the radio, with the selected slot timing on the desired time slot.

2. The method as claimed in claim 1, further comprising prior to the aligning step:

setting, by the radio, the selected slot timing to an internal slot timing when no communication activity is detected in the determining step.

3. The method as claimed in claim 2, further comprising prior to the initiating step:

configuring the radio with a channel access setting comprising one of a polite to all channel access setting, and a polite to own color code channel access setting.

4. The method as claimed in claim 1, further comprising, when no communication activity is detected in the determining step, prior to the aligning step:

determining, by the radio, whether the channel is currently in a direct mode call hangtime;

setting, by the radio, the selected slot timing to an internal slot timing when the channel is not currently in a direct mode call hangtime; and setting, by the radio, the selected slot timing to a last received call's slot timing when the channel is in a state of direct mode call hangtime.

5. The method as claimed in claim 4, further comprising prior to the initiating step:

configuring the radio with a channel access setting comprising one of a polite to all channel access setting, and a polite to own color code channel access setting.

6. The method as claimed in claim 1, further comprising:

denying transmission by the radio when there is communication activity present in the desired time slot of the channel.

7. The method as claimed in claim 6, further comprising prior to the initiating step:

configuring the radio with a polite to all channel access setting.

8. The method as claimed in claim 1, further comprising, when there is communication activity present in the desired time slot, prior to the aligning step:

determining, by the radio, if a color code of the communication activity in the desired time slot matches a radio color code that is provisioned into the radio;

denying transmission by the radio when the color code of the communication activity in the desired time slot matches the radio color code; and setting, by the radio, the selected slot timing to a slot timing of the communication activity in the desired time slot when the color code of the communication activity in the desired time slot does not match the radio color code.

9. The method as claimed in claim 8, further comprising prior to the initiating step:

configuring the radio with a polite to own color code channel access setting.

10. The method as claimed in claim 1, further comprising, when there is communication activity present in the desired time slot of the channel, prior to the aligning step:

setting, by the radio, the selected slot timing to a slot timing of the communication activity in the desired time slot; and wherein the transmitting step comprises transmitting, by the radio, on top of the communication activity in the desired time slot.

11. The method as claimed in claim 10, further comprising prior to the initiating step:

configuring the radio with an impolite channel access setting.

12. The method as claimed in claim 1, further comprising prior to the aligning step:

setting, by the radio, the selected slot timing to an internal slot timing when there is no communication activity present in the desired time slot of the channel and no communication activity present in the one or more undesired time slots of the channel.

13. The method as claimed in claim 12, further comprising prior to the initiating step:

configuring the radio with a polite to own color code channel access setting.

14. The method as claimed in claim 1, further comprising, when there is no communication activity present in the desired time slot of the channel and there is communication activity present in the one or more undesired time slots of the channel, prior to the aligning step:

setting, by the radio, the selected slot timing to a slot timing of the communication activity in the undesired time slot; and adjusting, by the radio, a timing from the undesired time slot to the desired time slot.

15. The method as claimed in claim 14, wherein the adjusting step comprises:

shifting, by the radio, the timing by a particular time slot duration.

16. The method as claimed in claim 14, wherein the one or more undesired time slots comprise at least two undesired time slots, and further wherein the adjusting step comprises:

shifting, by the radio, the timing by an integral multiple of the time slot duration.

17. The method as claimed in claim 14, further comprising prior to the initiating step:

configuring the radio with a channel access setting comprising one of polite to all channel access setting, a polite to own color code channel access setting, and an impolite channel access setting.

* * * * *